United States Patent
Ma

(10) Patent No.: US 12,467,549 B2
(45) Date of Patent: Nov. 11, 2025

(54) PUMP CONTROL SHOCK ABSORBER

(71) Applicant: Caterpillar Global Mining LLC, Tucson, AZ (US)

(72) Inventor: Pengfei Ma, Naperville, IL (US)

(73) Assignee: Caterpillar Global Mining LLC, Tucson, AZ (US)

( * ) Notice: Subject to any disclaimer, the term of this patent is extended or adjusted under 35 U.S.C. 154(b) by 114 days.

(21) Appl. No.: 18/310,640

(22) Filed: May 2, 2023

(65) Prior Publication Data

US 2024/0369078 A1   Nov. 7, 2024

(51) Int. Cl.
*F16K 17/04* (2006.01)
*F04B 49/03* (2006.01)
(Continued)

(52) U.S. Cl.
CPC ............ *F16K 17/046* (2013.01); *F04B 49/03* (2013.01); *F04B 53/10* (2013.01); *F15B 13/02* (2013.01); *F16K 3/26* (2013.01); *F16K 3/34* (2013.01); *F15B 2211/20553* (2013.01); *F15B 2211/40515* (2013.01); *F15B 2211/422* (2013.01);
(Continued)

(58) Field of Classification Search
CPC . F16K 17/046; F16K 3/26; F16K 3/34; F16K 2200/40; F04B 49/03; F04B 53/10; F15B 2211/20553; F15B 2211/40515; F15B 2211/422; F15B 2211/428; F15B 2211/522; F15B 2211/528; F15B 2211/55; F15B 2211/8606; F15B 2211/8613; F15B 2211/8665
See application file for complete search history.

(56) References Cited

U.S. PATENT DOCUMENTS 3,431,857 A   3/1969   Jennings et al.
3,728,860 A   4/1973   Coakley
(Continued)

FOREIGN PATENT DOCUMENTS

CN   2720158 Y   8/2005
CN   203499984 U   3/2014
(Continued)

OTHER PUBLICATIONS

Written Opinion and International Search Report for Int'l. Patent Appln. No. PCT/US2024/024175, mailed Jul. 2, 2024 (17 pgs).

*Primary Examiner* — Dustin T Nguyen
(74) *Attorney, Agent, or Firm* — Xsensus LLC

(57) ABSTRACT

A flow limiter for a cut-off valve of a hydraulic pumping system and a hydraulic system using such a flow limiter. The flow limiter provides for limiting a flow through a cut-off valve. The flow limiter for a cut-off valve of a hydraulic pumping system includes a valve body with a hollow channel. The hollow channel has a fluid inlet and a fluid outlet, and the fluid inlet is in fluid communication with a discharge line of the cut-off valve in a mounted state of the flow limiter. A valve element is slidably arranged within the channel and can transition from a first position towards a second position, if a predefined fluid pressure threshold is exceeded at the fluid inlet. The valve element is arranged in the hollow channel so that in the second position a fluid flow from the fluid inlet to the fluid outlet is larger than in the first position.

13 Claims, 5 Drawing Sheets

(51) Int. Cl.
*F04B 53/10* (2006.01)
*F15B 13/02* (2006.01)
*F16K 3/26* (2006.01)
*F16K 3/34* (2006.01)

(52) U.S. Cl.
CPC ... *F15B 2211/428* (2013.01); *F15B 2211/522* (2013.01); *F15B 2211/528* (2013.01); *F15B 2211/55* (2013.01); *F15B 2211/8606* (2013.01); *F15B 2211/8613* (2013.01); *F15B 2211/865* (2013.01); *F16K 2200/40* (2021.08)

(56) References Cited

U.S. PATENT DOCUMENTS

| | | | |
|---|---|---|---|
| 3,752,188 A * | 8/1973 | Sage | F16K 1/54 137/625.3 |
| 3,858,946 A | 1/1975 | Grosseau | |
| 4,000,754 A | 1/1977 | Risk | |
| 4,343,151 A * | 8/1982 | Lorimor | F15B 11/16 91/33 |
| 4,801,247 A | 1/1989 | Hashimoto | |
| 4,809,740 A | 3/1989 | Nevlud | |
| 5,396,924 A * | 3/1995 | Voss | F16K 17/046 137/491 |
| 6,672,285 B2 | 1/2004 | Smith | |
| 8,047,120 B2 | 11/2011 | Shinohara | |
| 8,511,081 B2 | 8/2013 | Jemuller | |
| 11,092,143 B2 * | 8/2021 | Lehmann | F04B 1/34 |

FOREIGN PATENT DOCUMENTS

| | | | | |
|---|---|---|---|---|
| CN | 105952932 | * | 9/2016 | ........... F16K 17/044 |
| CN | 105952932 B | | 9/2016 | |
| CN | 214465194 U | | 10/2021 | |
| JP | H07180190 A | | 7/1995 | |

* cited by examiner

PUMP CONTROL SHOCK ABSORBER

TECHNICAL FIELD

The present invention pertains to a flow limiter for a cut-off valve of a hydraulic pumping system and a hydraulic system comprising such flow limiter as well as a corresponding method for limiting a flow from a cut-off valve.

TECHNOLOGICAL BACKGROUND

In the field of hydraulic mining shovels (HMS) pumps such as bent axis pumps are typically operated under high pressures to provide the required performance, e.g. the translation of movable components. Although such pumps are generally designed to be operated under a large range of conditions and exhibit a corresponding durability, the number of main pumps on HMS machines prematurely failing is significant. Such pumps may e.g. already fail after a few thousand operating hours, leading to an unexpected and undesirable machine down time, high warranty, and customer dissatisfaction.

After inspection of field return pumps the present inventors identified that in the majority of prematurely failing pumps the malfunctioning had been caused during high pressure cut-off events. To mitigate such events, this would involve modifications of the directly downstream and/or upstream components of the pump, e.g. at the level of the downstream pressure cut-off valve and/or at the level of the upstream pilot valve. However, such modifications of the pump design may not be readily available or feasible and furthermore require an exchange of the pumping system upon overhaul, which is cost intensive and laborious and does not resolve the problem for pumping systems being currently implemented.

Accordingly, a need exists to further reduce the occurrence of high pressure cut-off events, in particular without requiring a redesigning of the pump components.

SUMMARY OF THE INVENTION

Starting from the prior art, it is an objective to provide a new and inventive means to reduce the occurrence of high pressure cut-off events in a hydraulic pumping system. In particular, it may be an objective to provide such means allowing an implementation in existing pumping systems without the need to redesign the pump components itself.

This objective is solved by means of a flow limiter for a cut-off valve with the features of claim 1. Preferred embodiments are set forth in the present specification, the Figures as well as the dependent claims.

Accordingly, a flow limiter for a cut-off valve of a hydraulic pumping system is suggested, comprising a valve body comprising a hollow channel having a fluid inlet and a fluid outlet, the fluid inlet being configured to be in fluid communication with a discharge line of the cut-off valve in the mounted state of the flow limiter, and a valve element slidably arranged within the channel and configured to transition from a first position towards a second position, if a predefined fluid pressure threshold is exceeded at the fluid inlet. The valve element is configured such that in the second position a fluid flow from the fluid inlet to the fluid outlet is larger than in the first position.

In a further aspect, a hydraulic pumping system for a hydraulic mining shovel is suggested, comprising a hydraulic pump, a cut-off valve downstream of the hydraulic pump, a discharge line in fluid communication with the cut-off valve, and a flow limiter according to the invention being in fluid communication with the discharge line.

Furthermore, a method for limiting a flow from a cut-off valve of a hydraulic pumping system, comprising the steps of:
providing a fluid pressure actuating the cut-off valve so as to provide a flow through a downstream discharge line; and
limiting said flow by slidably moving a fluidically coupled valve element within a valve body from a from a first position towards a second position,
wherein said movement towards the second position causes an increased fluid flow from a fluid inlet side of the valve element to a fluid outlet side of the valve element.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
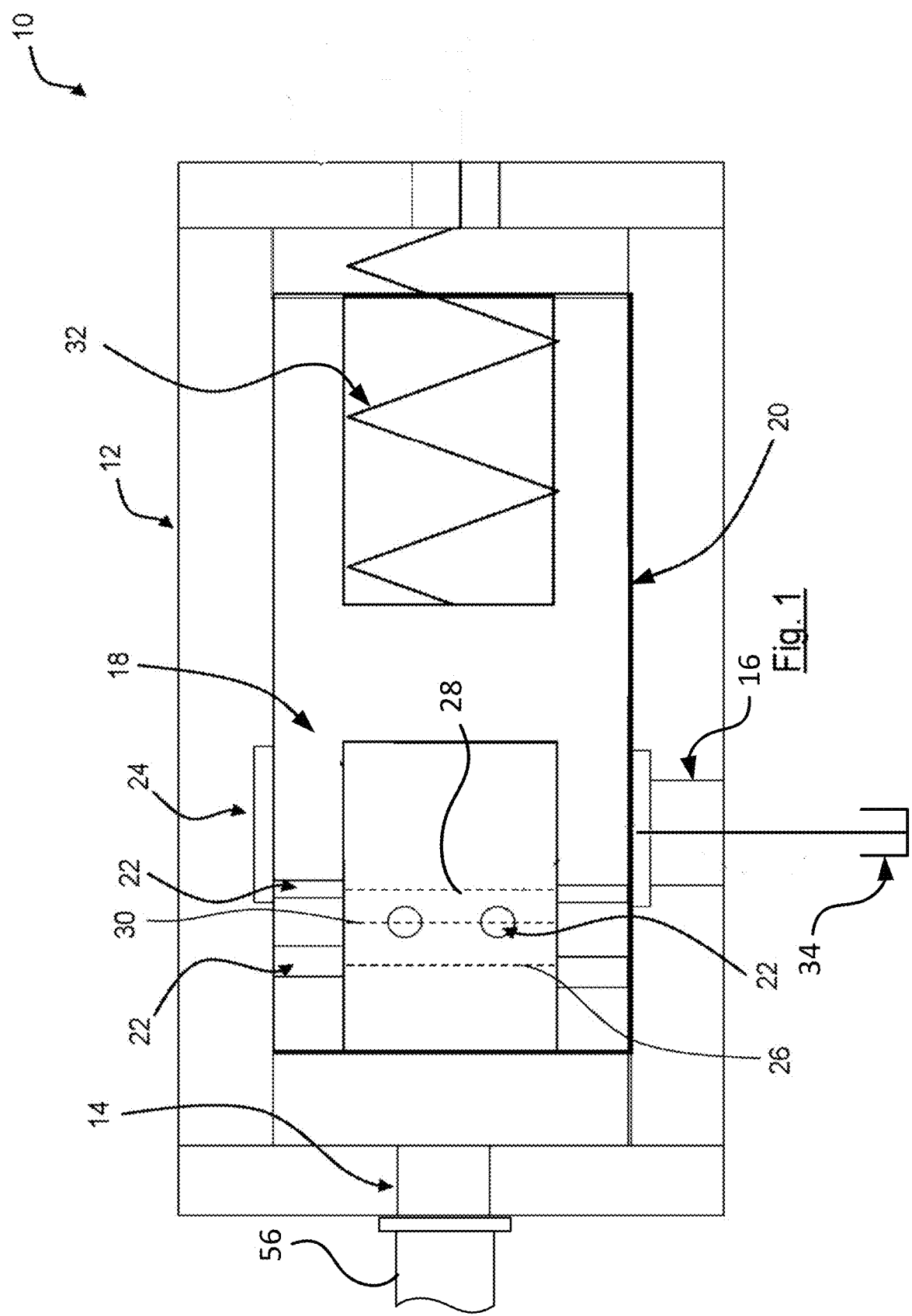
FIG. 1 shows an embodiment of a flow limiter according to the invention in a first position of the valve element thereof.

In the following, the invention will be explained in more detail with reference to the accompanying figures. In the Figures, like elements are denoted by identical reference numerals and repeated description thereof may be omitted in order to avoid redundancies.

In FIG. 1 an exemplary embodiment of a flow limiter 10 for a cut-off valve of a hydraulic mining system 50 (see. e.g., FIG. 5) is depicted. The flow limiter 10 comprises a valve body 12, which comprises a fluid inlet 14 as well as a fluid outlet 16. The fluid inlet 14 is configured to be connectable and be in fluid communication with a discharge line 56 (see, e.g., FIG. 5) of the cut-off valve in the mounted state of the flow limiter 10. The fluid inlet 14 and the fluid outlet 16 are in fluid communication with each other via a valve element 18, which in the present example is formed as a hollow spool and is slidably arranged within a channel 20 formed by the valve body 12. Said fluid communication is provided by means of a plurality of through-holes 22, which are formed in a wall of the valve element 18 and form a radial opening of the interior of the valve element 18 or hollow spool towards its exterior. The through-holes 22 may be aligned with a corresponding recess 24 formed at an inner wall of the valve body 12, wherein said recess 24 extends through the valve body 12 so as to form a fluid connection with the fluid outlet 16.

In the present non-limiting example depicted in FIG. 1, the valve element 18 is depicted in a first position, wherein some of the through-holes 22 are already aligned with the recess 24. The recess 24 may be formed as a continuous recess in a circumferential direction, such that the orientation a fluid communication between the fluid inlet 14 and the fluid outlet 16 may be provided independent of the orientation of the through-holes 22. When a fluid pressure at the fluid inlet 14 exceeds a predefined pressure threshold, the fluid displaces the valve element 18 or hollow spool in a longitudinal direction towards an opposing end of the channel 20. Due to said movement, the valve element 18 transitions towards a second position (not shown), such that further through-holes 22 may be aligned with the recess 24 and hence an increased fluid flow is achieved in comparison with the fluid flow provided in the first position.

As shown, the plurality of through-holes 22 may be provided as rows of holes being arranged at respective circumferences that are offset to each other in a longitudinal direction. Accordingly, through-holes 22 may be present along a first circumference 26 indicated with the dashed line, which are arranged so as to be aligned with the recess 24 in the second position of the valve element 18. The through-holes 22 being in alignment with the recess 24 already in the first position are accordingly arranged along a second circumference 28, also indicated with a respective dashed line. As shown, the through-holes 22 along the first and second circumference 26, 28 may be slightly offset to each other in a longitudinal direction, but at least partially overlap in the longitudinal direction.

Also shown in FIG. 1 are through-holes 22 along a third circumference 30 between the first circumference 28 and the second circumference 26. Said through-holes 22 along the third circumference 30 may provide an increase in fluid flow from the fluid inlet 14 to the fluid outlet 16, when the valve element 18 transitions from the first position to the second position via an intermediate position.

When the valve element 18 is brought into the second position, the through-holes 22 of along the first, second, and third circumference 26, 28, 30 are aligned with the recess 24, such that the largest fluid flow is present in the second position. Furthermore, the diameter of the through-holes may optionally be increased along the first circumference 26 and/or the third circumference 30, such that a predefined increase in fluid flow towards the fluid outlet 16 is provided in accordance with the positional transitioning of the valve element 18, e.g. in a linear or non-linear fashion. In this regard, the through-holes 22 along the first circumference 26 may also have a larger diameter than the through-holes 22 along the third circumference 30.

Figure 4:
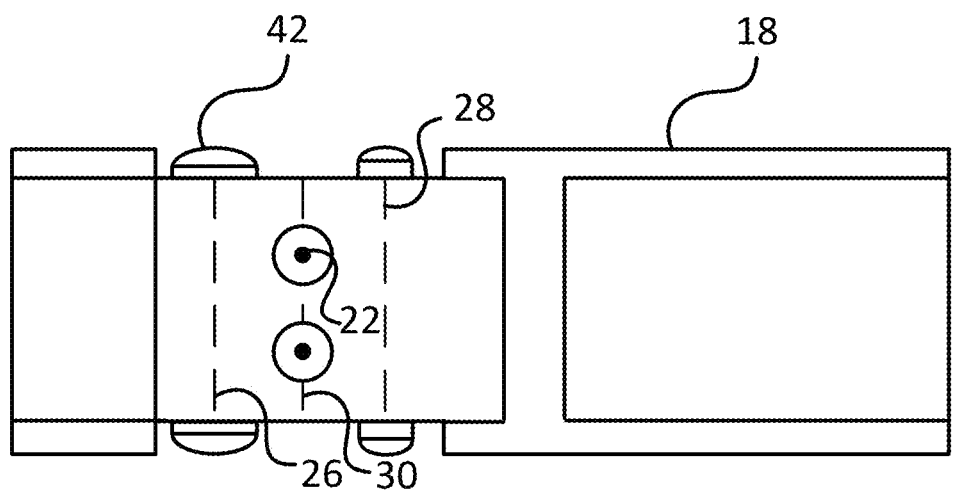
FIG. 4 is an exemplary valve element by which the present inventive concept can be embodied.

While the through-holes 22 are preferably provided within a circumferential wall of the valve element 18 to improve contact with the inner surface of the channel and improve slidability, the through-holes 22 may alternatively be provided by protrusions 42 (see, e.g., FIG. 4), e.g. radially protruding tube-like elements or radially protruding disc-like circumferential elements.

To retain the valve element 18 in the second position, the valve body 12 may comprise a biasing mechanism or element, which according to the present example is formed as a spring 32 being accommodated within the channel 20 and arranged at an end portion longitudinally opposing the fluid inlet 14. The spring 32 exerts a biasing force to the valve element 18, if the valve element 18 is displaced by the fluid pressure beyond the second position, wherein the biasing force of the spring 32 may be adapted to allow a predefined displacement, e.g. due to an initial pressure surge. By means of the spring 32 a mechanical dampening may hence be provided in addition to the hydraulic dampening provided by the plurality of through-holes 22 and the fluid inlet 14.

The fluid outlet 16 may be connected to a downstream vessel 34, e.g. a tank or collection container of the pumping system. Also shown at the downstream end of the flow limiter 10 is an optional throttling orifice, which may provide a further hydraulic dampening of the fluid flow or pressure from the cut-off valve. Said optional throttling orifice may also be provided upstream of the flow limiter 10 and downstream of the cut-off valve, e.g. in an integrated manner at the fluid inlet 14 of the flow limiter 10.

Figure 2:
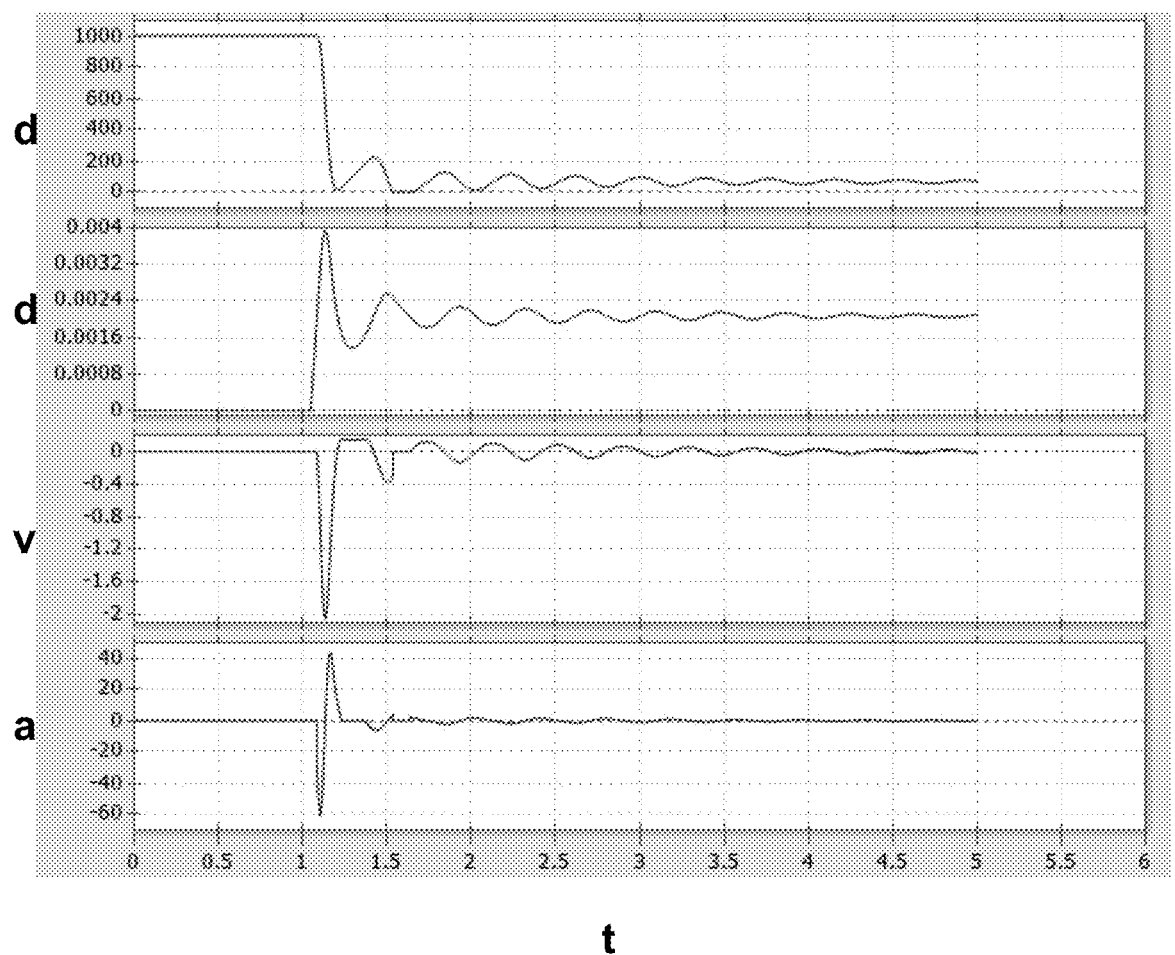
FIG. 2 shows various parameters of a pumping system upon actuation of a cut-off valve.

FIG. 2 shows various parameters of a pumping system upon actuation of a cut-off valve without an implemented flow limiter. From top to bottom, the panels depicted a pump displacement d, a spool displacement of the cut-off valve d (in meter), a pump actuator velocity v (in meter), and a pump actuator acceleration a (in meter per square second).

As shown at about 1 second, the displacement of the pump components and the spool of the cut-off valve occurs very steep and the speed and acceleration of the actuator of the pump exhibit a corresponding spike. The high pressure cut-off event initiated by the actuation of the cut-off valve hence results in a very rapid and sudden movement of the actuator. As described above, this may result in a tilting of a barrel towards the lens plate due to the large inertia of the barrel, causing significant wear on both the barrel and the lens plate.

Figure 3:
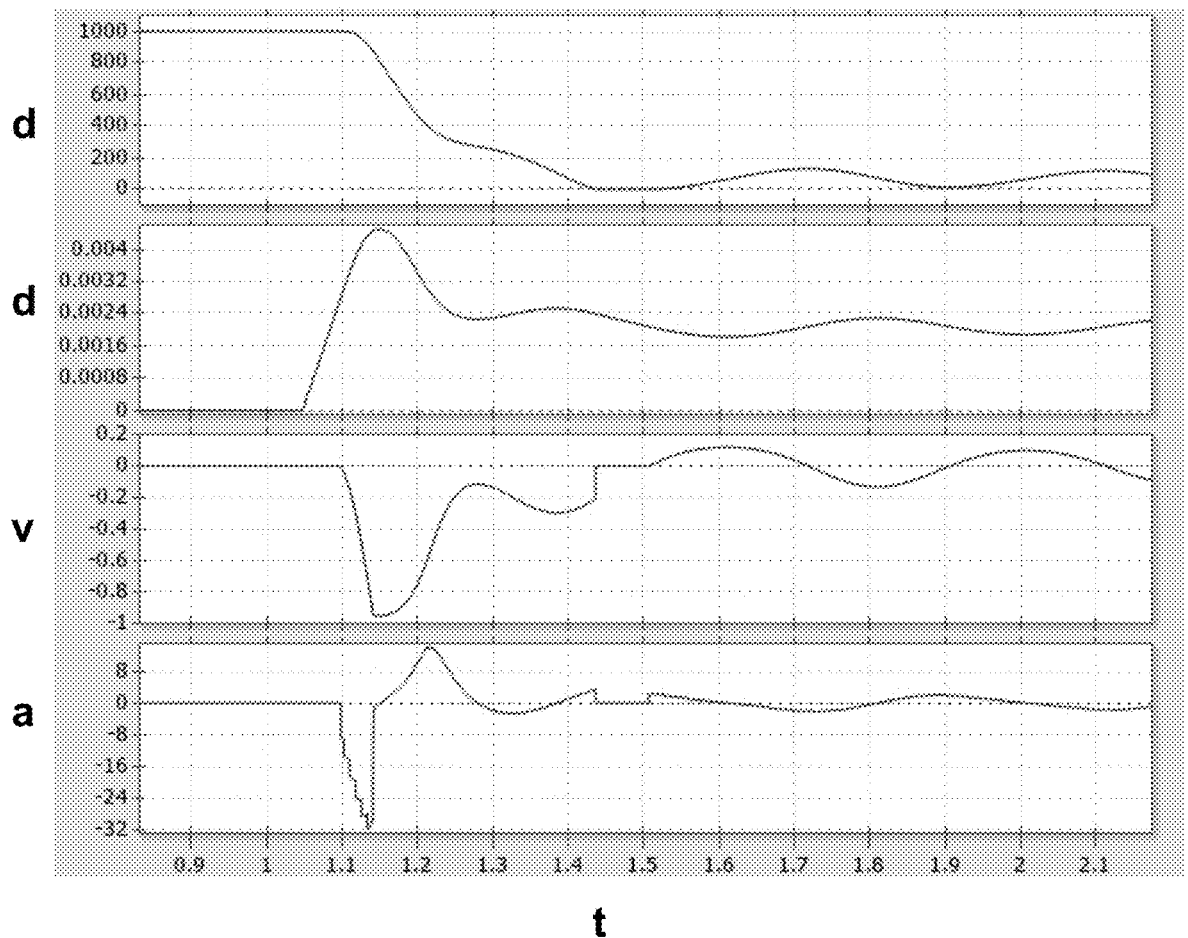
FIG. 3 shows the parameters of the pumping system according to FIG. 2 upon actuation of the cut-off valve with an implemented flow limiter.

The parameters of the pumping system depicted in FIG. 2 are also depicted in FIG. 3, however, for a pumping system with a flow limiter implemented downstream of the cut-off valve.

As shown, the implementation of the flow limiter significantly reduces the actuator speed (third panel from top) and the actuator acceleration (bottom panel) by about half, i.e. from about −2 m/s to −1 m/s and from about −60 m/s$^2$ to about −30 m/s$^2$. Accordingly, a dampening is effected such that the detrimental effect of the high-pressure cut-off event on the actuator may be significantly reduced.

Furthermore, although the time scale is for FIGS. 2 and 3 is not identical, it may be appreciated that the displacement of the spool of the cut-off valve and the pump may be provided more gradually upon implementation of the flow limiter. Thereby, rapid movements and fluctuations of the pump components may be advantageously diminished.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A flow limiter for a cut-off valve of a hydraulic pumping system is provided.

Said flow limiter comprises a valve body comprising a hollow channel having a fluid inlet and a fluid outlet, the fluid inlet being configured to be in fluid communication with a discharge line of the cut-off valve in the mounted state of the flow limiter, and a valve element slidably arranged within the channel and configured to transition from a first position towards a second position, if a predefined fluid pressure threshold is exceeded at the fluid inlet. Said valve element is furthermore configured such that in the second position a fluid flow from the fluid inlet to the fluid outlet is larger than in the first position.

As described above, the inventors have found that defects in returned pumps were likely to have been caused during high pressure cut-off events. In particular, it was found that in bent axial pumps, the center pin cup was broken, with marked jet erosion and cavitation erosion both on the barrel or cylinder block surface and on the lens plate or valve plate surface. As a cause, it was determined that a separation between the barrel and the lens plate has occurred.

After studying the pump control, it was found that such separation or tilting occurred during a high pressure cut-off event caused by the downstream pressure cut-off valve. Since no restriction exists downstream of the pressure cut-off valve, the actuator, e.g. a servo piston cylinder, moves extremely fast upon actuation of the cut-off valve. Accordingly, the lens plate, which is connected to the actuator, moves approximately at the same speed upon actuation.

However, due to the high inertia, the barrel cannot follow suit, thus causing a separation or tipping of the barrel relative to the lens plate. Based on the separation or tipping high speed oil jets are directed to the surfaces of the barrel and lens plate, thereby generating its detrimental erosion and increased wear.

By means of the provided flow limiter for the cut-off valve, according to the invention, a more gradual and/or reduced pressure difference may be established. By diminishing said pressure difference, the disadvantageous initial acceleration of the pump actuator upon actuation of the cut-off valve may be effectively reduced.

In other words, the flow limiter according to the invention may hence function as a shock absorber for the movement of the actuator, wherein the large inertia of the barrel is factored into the movement and the occurrence of tilting or separation of the barrel relative to the lens plate may be effectively avoided or reduced to the largest possible extent. Accordingly, jet erosions may be diminished, such that the overall wear and the frequency of overhaul or inspection of the pump may be reduced.

Furthermore, the provision of a downstream flow limiter for the cut-off valve enables a solution that may be separately implemented. The flow limiter may hence be built into existing pumping systems, obviating solutions requiring e.g. a re-design of the cut-off valve such as adding a damping to the cut-off valve spool. Accordingly, the flow limiter hence advantageously provides a shock absorbing solution that is independent of the particular pump design.

The valve element may be configured such that in the second position the fluid flows from the fluid inlet to the fluid outlet via the valve element, preferably at least partially through the valve element. The valve element may e.g. be formed as a hollow spool with one or more openings towards the fluid outlet end which form a fluid communication between the fluid inlet end and the fluid outlet end in the second position. The fluid may accordingly flow from the fluid inlet to the fluid outlet via a portion of the channel and at least a portion of the valve element.

Alternatively or in addition, the valve element and/or valve body may be configured such that the fluid outlet is arranged with a longitudinal offset to the fluid inlet, wherein said fluid outlet is preferably separated from the fluid inlet by the valve element in both the first position and second position. Accordingly, the valve element may be arranged so as to provide a fluid obstruction and deflection of a fluid flow.

The fluid outlet of the valve body is preferably configured to be coupleable with a downstream container or tank. In other words, the fluid outlet of the valve body is preferably not connected to an actuating component of the pump system, but is configured to provide a fluid flow to reduce excess pressure in a controlled manner and discharge said corresponding fluid, typically oil, to a downstream vessel, e.g. a container or tank.

Figure 5:
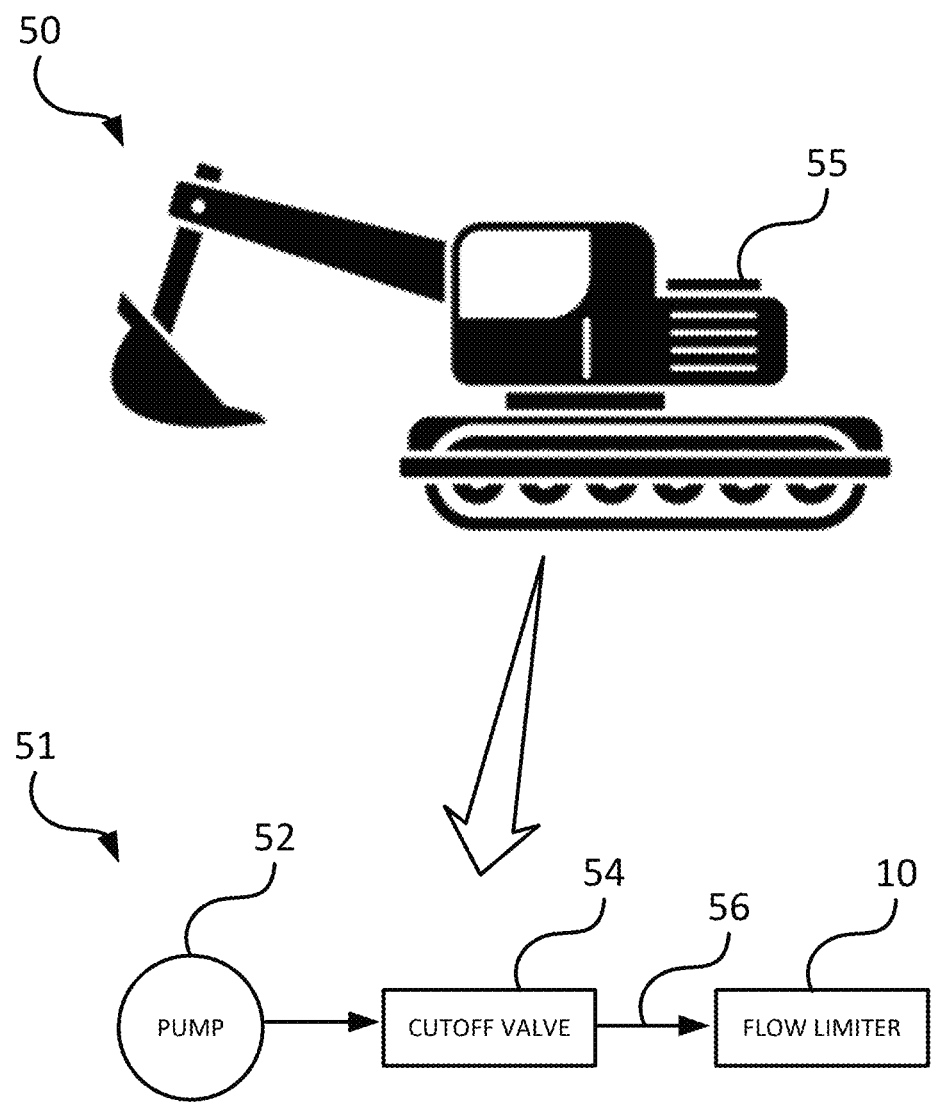
FIG. 5 is an exemplary mining shovel and hydraulic system by which the present inventive concept can be embodied.

Although the flow limiter may be implemented for one or more of a variety of cut-off valves 54 (see, e.g., FIG. 5), the flow limiter may be advantageously configured for a hydraulic pumping system 51 of a hydraulic mining shovel 55 (see, e.g., FIG. 5). In such hydraulic mining shovels 55, the pressure cut-offs may be significant and corresponding pressure differences may particularly cause rapid accelerations of the pump 52 (see, e.g., FIG. 5) actuator, e.g. an actuator of a bent axial pump. As described above, limiting the fluid flow downstream of the cut-off valve valve(s) 54 may hence significantly reduce said pressure differences, such that the wear on the pump components, e.g. the barrel and the lens plate may be effectively reduced.

The predefined fluid pressure threshold, which upon exceeding causes the valve element to transition from the first position towards the second position, may be between 1 percent and 5 percent of the cut-off valve pressure. In particular, the cut-off valve pressure may be between 25 MPa and 40 MPa. Said high valve pressure may e.g. correspond to a cut-off valve pressure for a pumping system of a hydraulic mining shovel. The percentage enables that the threshold may be set at a relative ratio for the respective pumping system rather than requiring an absolute pumping pressure, such that the threshold may be easily adapted to a variety of operating conditions. Furthermore, the lower percentage allows that the flow limiter is actuated already at an early stage of the actuation of the cut-off valve and a restriction of the fluid flow and hence of the acceleration of the upstream pump actuator may hence be readily provided.

To adapt the fluid inlet to the discharge line 56 (see, e.g., FIG. 5) of the cut-off valve, the fluid inlet may comprise a corresponding entrance orifice, which is preferably chosen so as to comprise a smaller inner diameter than the inner diameter of the discharge line. Thereby, the fluid inlet may advantageously provide a hydraulic restriction in addition to the valve element and/or valve body configuration.

The valve element may be configured to transition between the first position and the second position into an intermediate position, if the predefined fluid pressure threshold is exceeded at the fluid inlet, wherein the valve element is configured such that in the intermediate position the fluid flow from the fluid inlet to the fluid outlet is larger than in the first position and smaller than in the second position.

By means of an intermediate position it may be provided that a flow from the inlet to the outlet is successively increased upon displacement of the valve element within the channel. By means of the intermediate position an initially restricted flow may hence be gradually increased, further improving a hydraulic dampening while at the same time avoiding that a too large flow restriction or pressure build-up is established upon actuation of the cut-off valve. Accordingly, a gradual diminishing of the fluid pressure and a corresponding reduction in acceleration of an upstream actuator may be advantageously provided.

To provide or facilitate the fluid flow from the inlet to the outlet of the valve body or channel thereof, a wall of the valve element may comprise at least one radial through-hole along a first circumference and being in fluid communication with the fluid inlet, wherein the channel comprises a radial recess in fluid communication with the fluid outlet, wherein the at least one radial through-hole along the first circumference and the recess are arranged such that they are longitudinally and/or radially aligned in the second position.

The wall may e.g. define an inner cavity of the valve element which may be open towards the fluid inlet and be closed towards the fluid outlet, e.g. in the form of a hollow piston or spool. Once the predefined fluid pressure is exceeded, the fluid may cause a displacement of the valve element towards the second position or into the second position. The hollow interior of the valve element provides that the fluid from the fluid inlet may flow through the valve element at least in the second position, wherein the one or more corresponding radial holes enable that said fluid may be conveyed towards the fluid outlet. The valve element may hence be displaced in a longitudinal direction by the increased fluid pressure, resulting in an alignment of the one or more holes with the recess so as to establish or increase a fluid communication between the fluid inlet and fluid outlet.

Furthermore, the one or more radial holes provide radial deflection of the fluid flow, which has been found to be particularly advantageous in view of the intended pressure reduction or hydraulic dampening function of the flow limiter.

The wall of the valve element may also comprise at least one radial through-hole along a second circumference, wherein said through-hole is in fluid communication with the fluid inlet, wherein the second circumference is axially offset to the first circumference and wherein the at least one radial through-hole along the second circumference and the recess are arranged such that they are longitudinally and/or radially aligned at least in the first position.

The provision of one or more through-holes that are longitudinally aligned with the recess in the first position enables that some extent of fluid flow from the fluid inlet to the fluid outlet may be provided even in the absence of a fluid pressure exceeding the predefined pressure threshold.

Although the flow limiter may be configured such that no fluid flow between the fluid inlet and the fluid outlet is enabled in the first position, e.g. to simplify the design or reduce the number of flow variables, the enablement of a fluid flow in the first position may reduce the initial restriction, i.e. avoid a full obstruction. Thereby, a more gradual reduction of the excess pressure may be provided while at the same time the pressure may be more readily reduced.

To improve the gradual or successive pressure reduction the at least one through-hole along the first circumference may comprise a larger diameter than the at least one opening along the second circumference. Accordingly, a larger fluid flow from the inlet to the outlet may be provided in the second position.

In accordance, the second circumference may be arranged such that the corresponding one or more through-holes thereof are also aligned with the recess in the second position of the valve element, thereby further increasing the fluid flow.

The wall of the valve element may also comprise at least one radial through-hole along a third circumference, wherein said at least one radial through-hole is in fluid communication with the fluid inlet, wherein the third circumference is longitudinally offset to the first circumference and wherein the at least one radial through-hole along the third circumference and the recess are arranged such that they are longitudinally and/or radially aligned at least in an intermediate position between the first position and the second position.

By means of the one or more through-holes at the third circumference, a fluid flow may be provided, preferably increased, when the valve element transitions from the first position to the second position via an intermediate position. Thereby, the occurrence of flow fluctuations may be reduced and an even more gradual increase of the flow from the fluid inlet to the flow outlet and corresponding gradual pressure reduction may be provided. The third circumference may be advantageously arranged such that the corresponding one or more through-holes thereof are also aligned with the recess in the second position of the valve element, thereby further increasing the total fluid flow in the second position.

Accordingly, a variety of through-hole configurations may be provided, wherein the through-holes are preferably arranged and dimensioned such that the all through-holes are aligned with the recess in the second position, hence providing the largest fluid flow, wherein said fluid flow is gradually increased from the first position to an intermediate position and finally to the second position.

While a single through-hole may be present along the respective circumference of the wall, e.g. depending on the required flow limitation and/or dimensioning of the through-hole, the wall may comprise more than one through-hole along at least one respective circumference. The through-holes along the respective circumference are then advantageously circumferentially spaced apart and are each arranged to be in fluid communication with the recess in the corresponding position of the valve element.

The through-holes may hence form a row of holes along the circumference at a respective longitudinal position of the wall, wherein the recess is arranged and/or formed so as to provide a fluid communication between the fluid inlet and the fluid outlet, when the through-holes are in the respective position. For example, the recess may be formed continuously along an inner circumference to establish a fluid communication with the through-holes independent of their circumferential spacing and/or may extend in the longitudinal direction so as to enable a fluid communication with the through-holes in the first position, second position and any intermediate position.

As described above, the provision of an increased fluid flow in the second position compared with the first position may provide a hydraulic dampening by restricting the fluid flow downstream of the cut-off valve. Such dampening function may be further improved and provide an even more gradual reduction of the downstream fluid flow e.g. by providing an orifice at the fluid inlet having smaller dimensions than the inner diameter of the discharge line and/or by ensuring that a fluid flow from the fluid inlet to the fluid outlet is also provided in the first position and/or in an intermediate position. The gradual flow or pressure reduction may provide a dampening that may be advantageous for limiting the movement of the upstream pump actuator, e.g. in the form of a hydraulic shock absorption.

In addition to the hydraulic dampening or shock absorption, a mechanical dampening or shock absorption may also be provided, e.g. to further facilitate the function of the flow limiter.

To this end, the flow limiter may comprise a biasing mechanism configured to retain the valve element in the second position, if the predefined fluid pressure is exceeded. The biasing mechanism may be formed as a spring element accommodated within the channel at an end portion opposing the fluid inlet.

By means of the biasing mechanism, e.g. the spring, the displacement of the valve element may be limited, preferably in the longitudinal direction, to ensure that a fluid flow towards the fluid outlet is enabled or maintained. Once the fluid pressure threshold is exceeded, the valve element may e.g. be displaced in the longitudinal direction within the channel such that one or more radial through-holes in a wall of the valve element may be aligned with a recess of the valve body. Accordingly, a fluid communication between the fluid inlet and the fluid outlet is provided or maintained and a corresponding flow is increased in the second position. The provision of the biasing mechanism, e.g. at an end portion of the channel longitudinally opposing the fluid inlet, hence provides a biasing force towards the valve element, such that the valve element is biased into the second position, if the valve element is displaced beyond the second position due to the increased fluid pressure at the fluid inlet.

Depending on the required mechanical dampening, the biasing force of the biasing mechanism may be chosen such that a predefined displacement beyond the second position may be provided, e.g. upon an initial pressure surge after actuation of the cut-off valve, under expected operating conditions. The biasing force of the biasing mechanism for such predefined displacement is advantageously chosen such that a fluid flow from the fluid inlet to the fluid outlet is maintained in such extended displacement of the valve element. The biasing force may furthermore ensure that the valve element is returned into the second position after an initial peak fluid pressure has been reduced.

By the same token, the biasing mechanism may also be configured to return the valve element into the first position, once the fluid pressure at the fluid inlet no longer exceeds the predefined threshold. Accordingly, the biasing mechanism may also be configured so as to contribute to or define the fluid pressure threshold.

The provision of the mechanical dampening together with the hydraulic dampening has been shown to further effectively reduce the initial acceleration of the pump actuator, thereby further reducing the probability of a separation or tipping of the cylinder block or barrel relative to the lens plate within the hydraulic pump.

Furthermore, a hydraulic pumping system for a hydraulic mining shovel is suggested, comprising a hydraulic pump, a cut-off valve downstream of the hydraulic pump, a discharge line in fluid communication with the cut-off valve, and a flow limiter according to the invention as described above being in fluid communication with the discharge line.

The hydraulic pumping system may comprise a main pump being configured as a bent axial pump comprising a barrel, also known as a cylinder block, and a lens plate, also known as a valve plate, wherein the barrel and lens plate are directly coupled to each other. To actuate the bent axial pump, e.g. modify the position of the piston rods contained within the cylinder block(s) relative to the shaft coupled to said piston rods, an actuator is present at the side of the lens plate opposing the barrel side. Such actuator may e.g. be present in the form of a servo piston that is coupled to the lens plate by means of a center pin. Thereby, actuation of the servo piston enables a tilting of the barrel and lens plate relative to the longitudinal axis defined by the shaft.

To avoid potential detrimental pressures or an overpressure from occurring, the pumping system comprises a cut-off valve. As described above, the provision of the flow limiter may effectively reduce the pressure differences typically occurring upon actuation of a cut-off valve. Thereby, the initial acceleration of the actuator, e.g. the servo piston, may be effectively reduced and/or dampened, such that the probability of a tilting or separation of the barrel relative to the lens plate may be significantly reduced and wear of the corresponding pump components may be minimized.

To further reduce the acceleration of the actuator and/or the pressure being established by the hydraulic system, the hydraulic system may comprise a throttling orifice upstream and/or downstream of a pilot valve of the hydraulic pump and/or downstream of the cut-off valve. An orifice upstream of the pilot valve is advantageously between 1 mm and 3 mm while an orifice downstream of the pilot valve is advantageously between 2 mm and 5 mm. An orifice downstream of the cut-off valve is advantageously between 4 mm and 7 mm.

By restricting the flow at the level of the pilot valve the fluid pressure for actuating the pump components may be reduced, such that the effect of a cut-off event on the acceleration of the actuator may be further diminished.

By the same token, by restricting the flow downstream of the cut-off valve, e.g. at the discharge line upstream of the flow limiter a pressure drop downstream of the pump may be reduced. The flow limiter then advantageously provides a further dampening of the downstream fluid pressure and corresponding acceleration of the upstream actuator of the pump. The downstream throttling orifice may also be implemented at the fluid inlet of the valve body of the flow limiter, i.e. a diameter of an orifice at the fluid inlet may be chosen so as to provide a first hydraulic restriction of the discharge line while the configuration of the valve body and the valve element provide an advantageous further restriction and dampening.

Furthermore, a method for limiting a flow from a cut-off valve of a hydraulic pumping system is suggested, comprising the steps of providing a fluid pressure actuating the cut-off valve so as to provide a flow through a downstream discharge line; and limiting said flow by slidably moving a fluidically coupled valve element within a valve body from a from a first position towards a second position, wherein said movement towards the second position causes an increased fluid flow from a fluid inlet side of the valve element to a fluid outlet side of the valve element.

The provision of the fluid pressure may be understood as an activation step of the cut-off valve, but may also be understood as receiving a corresponding fluid pressure through said discharge line. In other words, the actuation of the cut-off valve may optionally be included according to the method while it may also be provided according to the method that such fluid pressure is received at a fluid inlet of a valve body.

The features and advantages discussed with respect to the flow limiter and the hydraulic pumping system also apply to the method and vice versa.

Industrial Applicability

With reference to the Figures, a flow limiter for a cut-off valve of a hydraulic pumping system as well as a corresponding hydraulic pumping system and a method for limiting a flow from a cut-off valve are suggested. The suggested flow limiter and method as mentioned above are applicable in a variety of hydraulic pumping systems, such as for hydraulic mining shovels, wherein the risk of excessive wear of the pump components due to high pressure cut-off events is present. The provision of a flow limiter is particularly advantageous, since it provides a dampening of the corresponding pressure differences and hence diminishes the initial acceleration of an upstream actuator. Thereby the probability of a tilting or separation of pump components and corresponding wear may be significantly reduced. The disclosed flow limiter may be mounted into existing pumping systems, in particular at a discharge line downstream of the cut-off valve without requiring modifications of the cut-off valve or pumping system itself. Such mounting may be provided upon or prior to overhaul or prior to initial use.

What is claimed:

1. A flow limiter of a hydraulic pumping system, comprising:
a valve body comprising a hollow channel having a fluid inlet and a fluid outlet, and
a valve element slidably arranged within the channel of the valve body and configured to transition from a first position towards a second position within the channel under a condition where a predefined fluid pressure threshold is exceeded at the fluid inlet of the valve body, the valve element including protrusions through which respective through-holes are formed to be in communication with an interior of the valve element,
wherein the valve element is configured such that in the second position a fluid flow from the fluid inlet to the fluid outlet is larger than in the first position.

2. The flow limiter according to claim 1,
wherein the valve element is configured such that the fluid flows from the fluid inlet to the fluid outlet via the valve element or at least partially through the valve element in the second position, and/or
wherein the valve element and/or valve body are configured such that the fluid outlet is arranged with a longitudinal offset to the fluid inlet.

3. The flow limiter according to claim 1,
wherein the valve element is configured to transition between the first position and the second position into an intermediate position under the condition where the predefined fluid pressure threshold is exceeded at the fluid inlet of the valve body, and
wherein the valve element is configured such that in the intermediate position the fluid flow from the fluid inlet to the fluid outlet is larger than in the first position and smaller than in the second position.

4. The flow limiter according to claim 1,
wherein a wall of the valve element comprises at least one radial through-hole along a first circumference and being in fluid communication with the fluid inlet, as one or more of the through-holes formed through the respective protrusions,
wherein the channel of the valve body comprises a radial recess in fluid communication with the fluid outlet, and
wherein the at least one radial through-hole along the first circumference and the recess are arranged such that they are longitudinally aligned in the second position.

5. The flow limiter according to claim 4,
wherein the wall of the valve element comprises at least one radial through-hole along a second circumference and being in fluid communication with the fluid inlet, as one or more of the through-holes formed through the respective protrusions, the second circumference being longitudinally offset to the first circumference, and
wherein the at least one radial through-hole along the second circumference and the recess are arranged such that they are longitudinally aligned at least in the first position.

6. The flow limiter according to claim 5, wherein the at least one radial through-hole along the first circumference comprises a larger diameter than the at least one radial through-hole along the second circumference.

7. The flow limiter according to claim 4,
wherein the wall of the valve element comprises at least one radial through-hole along a third circumference and being in fluid communication with the fluid inlet, as one or more of the through-holes formed through the respective protrusions, the third circumference being longitudinally offset to the first circumference, and
wherein the at least one radial through-hole along the third circumference and the recess are arranged such that they are longitudinally aligned at least in an intermediate position between the first position and the second position within the channel.

8. The flow limiter according to claim 4, wherein the through-holes formed through the respective protrusions are circumferentially spaced apart from each other.

9. The flow limiter according to claim 1, comprising a biasing mechanism configured to allow the valve element to move to the second position, under the condition where the predefined fluid pressure is exceeded at the fluid inlet.

10. The flow limiter according to claim 9, wherein the biasing mechanism is formed as a spring accommodated within the channel of the valve body at an end portion opposing the fluid inlet.

11. The flow limiter according to claim 1,
wherein the predefined fluid pressure threshold is between 1 percent and 5 percent of a cut-off valve pressure, and
wherein the cut-off valve pressure is between 25 MPa and 40 MPa.

12. The flow limiter according to claim 1 configured for a hydraulic pumping system of a hydraulic mining shovel.

13. A hydraulic pumping system for a hydraulic mining shovel, comprising a hydraulic pump, a cut-off valve downstream of the hydraulic pump, a discharge line in fluid communication with the cut-off valve, and a flow limiter according to claim 1 being in fluid communication with the discharge line.

* * * * *